April 25, 1961  J. LOXHAM  2,981,514
VALVES
Filed June 5, 1957
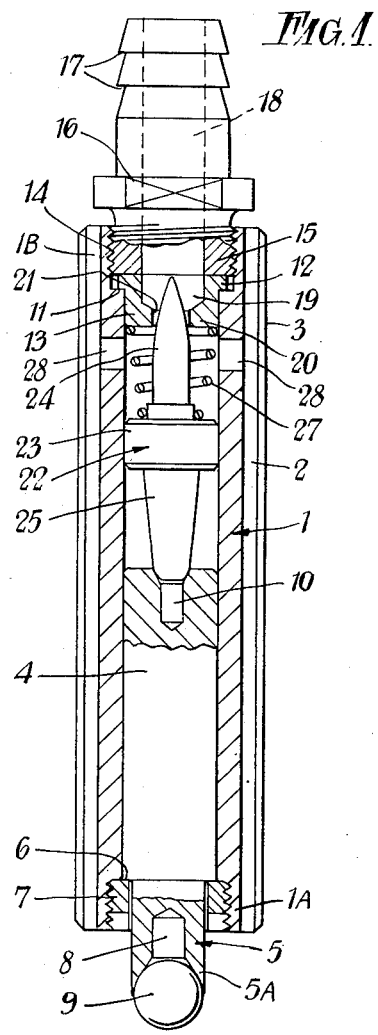

United States Patent Office 2,981,514
Patented Apr. 25, 1961

2,981,514
VALVES
John Loxham, Letchworth, England, assignor to The Sigma Instrument Company Limited, Letchworth, England, a British company Filed June 5, 1957, Ser. No. 663,692
Claims priority, application Great Britain June 6, 1956
2 Claims. (Cl. 251—86)

This invention relates to valves for controlling the flow of fluid.

It is an object of the present invention to provide a valve for a pneumatic gauge head, the valve having robust external surfaces coupled with high accuracy of the internal mechanism. To achieve this the valve is constructed in such a way as to enable the internal mechanism to be made of relatively soft easily machinable material whilst the casing part is of a material having a hard and hence robust external surface.

According to the present invention there is provided a gauge head valve for use with a pneumatic gauge, said valve comprising a cylindrical valve body having a cylindrical bore therethrough, a circular sectioned member secured in the bore and having a hole therethrough that forms a circular valve orifice, said orifice being concentric with said member and hence with said bore, a needle type valve member located in said bore, the valve member including a collar portion that is a sliding fit in said bore and a needle having a parabolic contour, the needle extending from the collar portion and entering said orifice, the needle being concentric with the collar and hence with said bore, and a circular sectioned plunger slidably entered in said bore, one end of the plunger projecting from one end of the body and the other end of the plunger being in abutting relationship with the valve member, the valve member and the circular sectioned member each being formed of a material which is softer than the valve body and softer than said plunger.

For a better understanding of the invention and to show how the same may be carried into effect reference will now be made to the accompanying drawing in which:

Figure 1 is a longitudinal section of a valve, and

Figure 2 is a sectional view, to an enlarged scale, of a detail of the valve of Figure 1.

The valve in this constructional form serves as the valve for the gauge head described in British patent specification No. 724,228, which head is used in a pneumatic gauge as described in British patent specification No. 724,205.

The valve has a cylindrical valve body 1 having a cylindrical bore and a plain or threaded exterior surface. In the case where a threaded surface is provided (that shown in the drawing) the body has longitudinal flutes 2 and the thread 3 is formed by grinding. The body 1 is of mild steel and the exterior surface thereof is case hardened. A cylindrical plunger 4 about half the length of the body 1 is slidably entered in the body 1. The plunger 4 has an extension 5 of reduced diameter which projects from the end 1A of the body 1. A shoulder 6 is formed on the plunger 4 at the location where the reduction in diameter takes place. A ring 7 co-axial with the extension 5 is screwed into the end 1A of the body 1 and projects radially inwards to form an abutment which co-operates with the shoulder 6. The projecting end 5A of the extension 5 has a funnel-shaped recess 8 formed therein, the recess 8 being co-axial with the plunger 4. A hardened steel ball 9 is secured in the mouth of the funnel 8 by soldering. Half of the ball enters the funnel 8 and the other half projects therefrom. A funnel-shaped recess 10 is formed in the other end of the plunger 4, the axis of this recess also being co-axial with the plunger 10. The angle of the cone of this funnel is about 60°. The plunger 4 is of mild steel and is case hardened and then ground to size to be a sliding fit in the bore of the body 1. The plunger 4 is ground whilst being rotated about a fixed centre that coincides with the axes of the recesses 8 and 10. This ensures that the axis of the recess 10 is truly central with respect to the bore of the body 1 when the plunger 4 is positioned within the bore.

The end portion 1B of the body has a circumferential shoulder 11 formed therein and an annular rib 12 on a collar 13 fitted into this end abuts against the shoulder 11. The bore of the body 1 as between the shoulder 11 and adjacent end of the body 1 is threaded at 14 and receives a plug 15 that holds the rib 12 in contact with the adjacent shoulder 11. The plug 15 is of mild steel and if desired is hardened and tempered. The plug 15 has a nut 16 formed integrally therewith to enable it to be tightened within the end portion 1B and the projecting end of the plug 15 has annular dovetail section grooves 17 for enabling a flexible hose (not shown) to be secured to the projecting end. A longitudinal passageway 18 is formed through the plug 15 and co-operates with a longitudinal hole 19 through the collar 13. At the inner end of the hole 19 an inwardly directed annular rib 20 is formed in the collar 13, the inner periphery of this rib 20 constituting an orifice 21. The collar 13 is formed from soft easily machinable material, such as German silver and during manufacture thereof the orifice 21 and the exterior surface of the collar 13 are formed during the same turning operation so that they are truly concentric.

A needle type valve member 22 is disposed in the bore of the body 1 between the plunger 4 and the collar 13. The valve member 22 consists of a central collar 23, a needle 24 having a parabolic contour which extends axially from the collar 23 and is entered in the orifice 21, and a spindle 25 that extends from the collar 23 and is entered in the mouth of the funnel-shaped recess 10 in the plunger 4. The spindle 25 tapers slightly in the direction from the collar 23 towards the plunger 4 and terminates in a partly spherical end 26 which engages in the mouth of the recess 10. The valve member 22 is made of a soft easily machinable material, such as German silver and the surfaces of the collar 23, the needle 24 and the spindle 25 are all turned at the same time on, for example, a Bechler sliding head automatic lathe so that the three surfaces are all truly concentric. The contour of the needle 24 is determined by an approximately profiled cam. The exterior surface of the collar 23 is a sliding fit in the bore of the body 1. A spring 27 is disposed between the collar 23 and the collar 13. The spring 27 urges the needle 24 from the orifice 21 and urges the partly spherical end 26 of the spindle 25 into contact with the plunger 4. Radially directed holes 28 are formed through the body 1 at a location between the collar 13 and the collar 23 so that air passing through the orifice 21 can escape from the body 1.

In use of the valve described above air is fed to the plug 15 by the flexible hose (not shown) which is connected in the circuit of a pneumatic gauge as described in British patent specification No. 724,205. Gauging movements are communicated to the hardened steel ball 9 by the lever (not shown) of a pneumatic head as described in British patent specification No. 724,228. Variations in the annular escape area between the surface of the needle 24 and the bore of the orifice 21 caused by measuring movements transmitted to the ball 9 cause variations in the pressure on the upstream side of the orifice 21.

Since the orifice 21 is formed truly concentric with the collar 13 which, in turn, is truly concentric with the bore of the body 1 and as the needle 24 is truly concentric with the collar 23 which is also truly concentric with the bore of the body 1, the needle 24 always remains concentric with respect to the orifice 21 in spite of any turning of the valve member 22 about its axis during use of the valve.

I claim:

1. A gauge head valve for use with a pneumatic gauge, said valve comprising a cylindrical valve body having a cylindrical bore therethrough and an outlet port communicating therewith, a circular sectioned member secured in the bore and having a hole therethrough that forms a circular valve orifice, said orifice being concentric with said member and hence with said bore, a needle type valve member located in said bore, the valve member including a collar portion which is slidably fitted in said bore and a needle having a parabolic contour, the needle extending from the collar portion and entering said orifice, the needle being concentric with the collar and hence with said bore, a circular sectioned plunger slidably entered in said bore, one end of the plunger projecting from one end of the body and the other end of the plunger having therein a circular sectioned converging recess that is coaxial with said plunger and hence with said bore, a spindle integral with the valve member, the spindle being coaxial with said collar portion and extending therefrom in the direction opposite to the needle, the spindle having a rounded end that is fitted in the recess in the plunger, and spring means located between said collar portion and said circular sectioned member for urging the valve member away from the said circular sectioned member, whereby the spindle is maintained in contact with the plunger, the valve member and the circular sectioned member each being formed of a material which is softer than the valve body and softer than said plunger.

2. The gauge head valve of claim 1 further defined in that, said outlet port is located between said collar portion and said circular sectioned member.

References Cited in the file of this patent

UNITED STATES PATENTS

| | | |
|---|---|---|
| 1,200,676 | Wiley | Oct. 10, 1916 |
| 1,980,752 | Eskilson et al. | Nov. 13, 1934 |
| 2,061,852 | Schweitzer | Nov. 24, 1936 |
| 2,096,807 | Hulbert | Oct. 26, 1937 |
| 2,118,013 | Matthews | May 17, 1938 |
| 2,618,457 | Davidson | Nov. 18, 1952 |
| 2,691,827 | Aller | Oct. 19, 1954 |
| 2,701,119 | Smith | Feb. 1, 1955 |
| 2,797,701 | Nurkiewicz | July 2, 1957 |
| 2,805,040 | Voss | Sept. 3, 1957 |